(12) United States Patent
Sauer

(10) Patent No.: US 6,350,343 B1
(45) Date of Patent: *Feb. 26, 2002

(54) METHOD OF TREATING AN ALUMINUM SURFACE TO IMPROVE ADHESION

(75) Inventor: Jochem Sauer, Rheinfelden (CH)

(73) Assignee: Vantico Inc., Brewster, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/860,762

(22) PCT Filed: Jan. 18, 1996

(86) PCT No.: PCT/GB96/00093

§ 371 Date: Jul. 11, 1997

§ 102(e) Date: Jul. 11, 1997

(87) PCT Pub. No.: WO96/23037

PCT Pub. Date: Aug. 1, 1996

(30) Foreign Application Priority Data

Jan. 24, 1995 (GB) .............................................. 9501287

(51) Int. Cl.⁷ .............................................. B32B 31/00

(52) U.S. Cl. ............... 156/272.8; 156/314; 219/121.85; 427/515; 427/554

(58) Field of Search .............................. 156/272.8, 314; 427/554, 515; 219/121.85

(56) References Cited

U.S. PATENT DOCUMENTS

| 4,356,233 A | * | 10/1982 | Lange et al. ................. 427/515 |
| 4,857,699 A | * | 8/1989 | Duley et al. ........... 219/121.85 |
| 4,861,407 A | * | 8/1989 | Volkmann et al. ....... 156/272.8 |
| 5,451,345 A | * | 9/1995 | Hatton et al. ................ 427/515 |

FOREIGN PATENT DOCUMENTS

| DE | 4312926 | 5/1994 | |
| EP | 353583 | 2/1990 | |
| EP | 592139 | 4/1994 | |
| JP | 50-29847 | * 9/1975 | .................. 156/314 |

* cited by examiner

Primary Examiner—John J. Gallagher
(74) Attorney, Agent, or Firm—Lyon & Lyon LLP

(57) ABSTRACT

The present invention provides a process for treating a metal surface which is aluminium or an aluminium alloy in order to improve its adhesion properties which comprises treating a clean metal surface with an organosilane and exposing the surface to a laser which produces an elevated temperature on the surface of the metal.

5 Claims, No Drawings

METHOD OF TREATING AN ALUMINUM SURFACE TO IMPROVE ADHESION

The present invention relates to a process for treating a metal surface especially aluminium in order to improve its adhesion properties.

Various methods for pretreating aluminium surfaces are known in order to provide thebasis for adhesive joints.

For aluminium, a lot of surface pretreatments such as picking-etching or phosphoric anodisation are well known for giving adhesive bonded joints with excellent performance and for instance are used in the aircraft industry. Pretreatments such as pickling-etching or phosphoric anodisation usually include a prior degreasing process which is generally carried out with the use of solvents or water based alkaline degreasing liquids. Subsequently rinsing processes, mostly with water, may be needed and eventually, a drying process. Then, in general, the etching or anodisation processes with liquid acids are carried out. Further rinsing and drying steps and even in some cases primer operations may follow. As these pretreatments involve the use of a lot of liquids they are referred to herein as "wet pretreatments". The "wet pretreatments" have some tremendous disadvantages. Their main disadvantages are of environmental nature, i.e. the nature and number of pretreatment agents and the problems to achieve short cycle times when pretreating larger components. For example the long pretreatment times in acid or rinsing baths compared to the short cycle-times of automative production would result in the necessity to install extremely large baths with acids. Tremendous investment costs and running costs would be necessary and these wet types of pretreatments would not be considered to be ecological good solutions. Another disadvantage of "wet pretreatments" is that in general for geometrically complex components their bath processes do not allow selective pretreatments of the bonding area only, because by submerging the component into the bath, an integral pretreatment of all of the submerged surface is effected. This has a disadvantageous impact on the running costs.

Alternatives to "wet pretreatments" have been developed and described for instance in EP 0326097, EP 0444701, U.S. Pat. No. 5,024,711 and DD 294472.

One method works with a flame and has a relatively low pretreatment speed. For good bonding performance this method requires a fresh metal surface before using the flame. This fresh metal surface can be achieved by sandblasting. After the flame pretreatment a standard silane primer has to be applied.

Another method known as the SACO method involves sandblasting with special coated particles and a subsequent primer coating with a silane-based solution. The bonding performance achieved with th is method in combination with e.g. 2-component epoxy or 2-component PUR adhesives is excellent.

The SACO pretreatment overcomes the main disadvantages of "wet pretreatments" but also suffers from some weak points. The major weak points of the SACO pretreatment are relatively high running costs (consumption of coated sand); messy working environment (sand dust); exhaust needed; and there is a danger of deformation of sensitive/thin components through the sandblasting.

We have now developed a process which overcomes the disadvantages of the known processes, while at the same time providing an excellent bonding and durability performance.

Accordingly the present invention provides a process for treating a metal surface which is aluminium or an aluminium alloy in order to improve its adhesion properties which comprises treating a clean metal surface with an organosilane and exposing the surface to a laser which produces an elevated temperature on the surface of the metal.

The present invention further provides a process for treating a metal surface which is aluminum or an aluminum alloy in order to improve its adhesion properties, which process comprises first applying a solution consisting essentially of a) 1 to 10% by weight of an organosilane and b) water and/or an organic solvent and c) optionally a carboxylic acid and/or nonionic wetting agent to a clean metal surface and then exposing the coated surface to a laser which produces an elevated temperature on the surface of the coated metal.

The metal surface may be treated with the organosilane and the laser in either order. Preferably however an organosilane is first applied to the metal surface and the coated surface is exposed to a laser.

If desired, the metal may be cleaned by degeasing with an organic solvent e.g. by wiping with a solvent such as acetone, vapour degreasing, dipping with or without ultrasonic treatment or by using alkaline degreasing agents.

The organosilane may be a compound of formula I

where R is an organic group which may be reactive or non-reactive, $R^1$ is alkyl, alkoxyalkyl or acyl, n is 1 or 2 and m is 2 or 3 such that n+m=4. Preferably n is 1 and m is 3.

Examples of organic groups R include alkyl, phenyl, vinyl, acrylatoalkyl, glycidyloxyalkyl and the like, where "alkyl" groups have 1 to 4 carbon atoms.

When $R^1$ is alkyl, it is preferably lower alkyl with 1 to 4 carbon atoms and most preferably methyl or ethyl. When $R^1$ is alkoxyalkyl, each alkyl moiety preferably has 1 to 4 carbon atoms. Most preferably as alkoxyalkyl $R^1$ is methoxyethyl. When $R^1$ is acyl it preferably has 2 to 4 carbon atoms, most preferably acetoxy.

Specific examples of suitable silanes are:

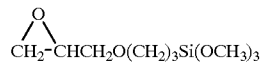

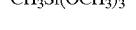

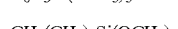

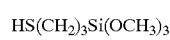

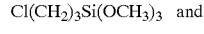

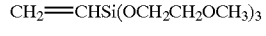

The silane may be used in solution in water or an organic solvent.

If water is used as the solvent and the silane is difficult to dissolve, a small amount of a nonionic wetting agent may be added to the water before the silane addition.

Alternatively, the silane may be used as an emulsion.

Suitable organic solvents include alcohols, esters, ethers, ketones and chlorinated hydrocarbons. Preferred alcohols are alkanols with 1 to 10 carbon atoms such as methanol, ethanol, propanol, hexanol and decanol. Preferred esters are $C_1$–$C_4$ alkyl esters of $C_1$–$C_4$ aliphatic carboxylic acids such as methyl acetate, ethyl acetate, butyl acetate and methyl propionate. Preferred ethers are dialkyl ethers such as diethyl ether, butoxyethanol and cyclic ethers such as tetrahydrofuran. Preferred chlorinated hydrocarbons are dichloromethane, 1,2-dichloroethane, and trichloroethane.

Preferred ketones are lower aliphatic ketones such as acetone and methyl ethyl ketone. Mixtures of these solvents may be used if desired The most preferred solvents are polar solvents such as ketones, especially acetone. Water and/or a carboxylic acid may also be added to suitable organic solvents as part of the solution.

The solution may contain any concentration of silane preferably from 1 to 10% by weight of the silane based on the total weight of the solution.

The organosilane solution may be applied by any suitable method, for example, wiping, brushing or spraying on to the areas to be treated.

Both the degreasing and application of organosilane solution may be carried out with automatic equipment such as robots.

Any laser which will produce an elevated temperature on the metal surface may be used, e.g. at 400 mJ/pulse. Suitable lasers include gas lasers, excimer lasers, $CO_2$ lasers, Nd:YAG lasers and Q-switched Nd:YAG lasers. Others are well known in the literature.

For high treatment speeds and not to damage the metal surface through unacceptable high energy concentrations, the best results are obtained using an unfocussed laser.

The actual power level needed to avoid damaging the metal surface depends on the actual surface being treated and on the specific laser used. This can be readily determined by simple experiment.

After the laser treatment the surface is ready for bonding although the treated surface is stable for at least 3 days. The bonding may be to another surface by means of an adhesive or by applying a coating to the surface. When bonding to another surface, that other surface may be metallic or non metallic. If it is metallic, it too may be pretreated by the same process as described above if desired.

When the treated surface is bonded to another surface, this may be achieved using various adhesives such as 1-component or 2-component epoxy adhesives, and 2-component polyurethane adhesives. Preferably the adhesive used is one which will react with the organosilane used in the process of the invention.

The process of the invention provides excellent joint performance, a fast treatment, a clean process, ecological advantages over the "wet" processes and sandblasting processes, low running costs, allows for the use of a wide range of adhesives and makes local treatment of the area to be bonded possible.

The invention is illustrated by the following Examples.

EXAMPLE 1

An aluminium alloy (Al 6063) is subjected to various combinations of pretreatments which are one or more of:
(a) degreasing by wiping the surface with acetone.
(b) priming by treatment with a solution containing 81.5 parts by weight ethanol, 2.8 parts by weight glacial acetic acid, 9.4 parts by weight deionised water and 6.3 parts by weight gamma-glycidoxypropyltrimethoxy silane.
(c) a laser operating at 240 mJ/pulse.
(d) a laser operating at 400 mJ/pulse.

Two pieces of the treated aluminium alloy are bonded using a 2-component cold curing epoxy resin. The resin component is a filled paste based on bisphenol A epoxy resin. The hardener component is a filled paste based on a mixture of aliphatic amine hardeners plus amine terminated butadiene acrylonitrile polymer.

The lap shear strength is measured immediately after curing of the adhesive and after 14 days ageing the bonded joints in cataplasma. The results obtained are as follows.

|  | LAP SHEAR AT 23° C. IN MPa | | | |
|---|---|---|---|---|
| PRETREATMENT | INITIAL | | 14 DAYS CATAPLASMA | |
| a | 13.1 | A/C | 10.7 | A |
| a + b | 16.6 | C | 13.7 | A |
| a + c | 18 | C | 14.3 | A |
| a + b + c | 17.5 | C | 16.5 | A |
| a + b + d | 19.8 | C | 19.6 | C |

Compared to degreasing only the initial lap shear strength increases by about 50% using the process of the invention. The biggest difference is seen after 14 days cataplasma when nearly 100% higher strength is achieved and the failure mode changes from adhesion failure (A) to the desired cohesive failure (C).

EXAMPLE 2

Example 1 is repeated with another adhesive being used:

In this case the samples are bonded using a 1-component epoxy resin. This is a filled paste based on bisphenol A epoxy resin and containing a reaction product of bisphenot F epoxy resin and carboxy terminated butadiene acrylonitrile polymer. The curing agent comprises dicyandiamide and a particulate accelerator.

The results obtained are as follows.

|  | LAP SHEAR AT 23° C. IN MPa | | | |
|---|---|---|---|---|
| PRETREATMENT | INITIAL | | 14 DAYS CATAPLASMA | |
| a | 24.7 | C | 16.7 | A/C |
| a + b + d | 25.8 | C | 21.7 | C |

This shows the good results obtained using the process of the invention in combination with 1-component, heat curing epoxy adhesives.

EXAMPLE 3

Aluminium alloy (Al 5251) is subjected to pretreatments as specified in Example 1 and bonded using the adhesive described in Example 2. The bonded joints are subjected to stress-humidity testing by stressing at 5N/mm$^2$ and exposed at 42° C. to 48° C. to 100% relative humidity. The results obtained are as follows.

| PRETREATMENT | DAYS OF SURVIVAL | FAILURE MODE |
|---|---|---|
| a | 90 | A/C |
| a + b + c | >550 | not yet failed |
| a + b + d | >550 | not yet failed |

The adhesion promoting effect of the process of the invention can be clearly seen by these results.

The adhesion promoting effect of the process of the invention can be clearly seen by these results.

EXAMPLE 4

Example 2 is repeated using an excimer laser filled with argon fluoride to give a wavelength of 193 nm. In this case some samples of the aluminium were first primed and then irradiated with the laser and some were first irradiated with the laser and then primed. The results obtained are as follows:

|  | Applied energy (J/mm$^2$) | Mean Strength (MPa) | Failure Mode |
| --- | --- | --- | --- |
| Primer then laser | 0.005 | 31.3 | C |
| " | 0.01 | 32.0 | C |
| " | 0.015 | 30.8 | C |
| Laser then primer | 0.O1 | 26.7 | A |
| " | 0.013 | 27.6 | A |
| " | 0.015 | 29.0 | A |
| Control | — | 19.9 | A |

It can be seen that while the treatment with the primer and laser is effective in either order, the best results are obtained using the primer first and then the laser.

I claim:

1. A process for treating a metal surface which is aluminum or an aluminum alloy in order to improve its adhesion properties, which process comprises first applying a solution consisting essentially of a) 1 to 10% by weight of an organosilane and b) water and/or an organic solvent and c) optionally a carboxylic acid and/or nonionic wetting agent to a clean metal surface and then exposing the coated surface to a laser which produces an elevated temperature on the surface of the coated metal.

2. A process as claimed in claim 1 in which the organosilane has the general formula I $$R_nSi(OR^1)_m$$

where R is an organic group which may be reactive or non-reactive, R$^1$ is alkyl, alkoxyalkyl, or acyl, n is 1 or 2 and m is 2 or 3 such that n+m=4.

3. A process as claimed in claim 1 in which the metal surface is cleaned by degreasing with an organic solvent.

4. A process as claimed in claim 1 in which the laser is a non-focussed laser.

5. A method of bonding a metal surface which is aluminium or an aluminium alloy to another surface which comprises treating the metal surface by a process as claimed in claim 1 and then bonding it to the other surface with an adhesive.

* * * * *